United States Patent
Otake et al.

(10) Patent No.: US 10,220,825 B2
(45) Date of Patent: Mar. 5, 2019

(54) VEHICLE CONTROL APPARATUS

(71) Applicant: TOYOTA JIDOSHA KABUSHIKI KAISHA, Toyota-shi (JP)

(72) Inventors: Hirotada Otake, Susono (JP); Masaki Takano, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 22 days.

(21) Appl. No.: 15/665,749

(22) Filed: Aug. 1, 2017

(65) Prior Publication Data

US 2018/0037214 A1 Feb. 8, 2018

(30) Foreign Application Priority Data

Aug. 4, 2016 (JP) ................................. 2016-153872

(51) Int. Cl.
*B60W 10/18* (2012.01)
*B60W 10/20* (2006.01)
*B60W 30/12* (2006.01)
*B60W 40/105* (2012.01)
*B60K 28/06* (2006.01)
(Continued)

(52) U.S. Cl.
CPC .............. *B60W 10/18* (2013.01); *B60K 28/06* (2013.01); *B60W 10/20* (2013.01); *B60W 30/12* (2013.01); *B60W 30/18* (2013.01); *B60W 40/08* (2013.01); *B60W 40/105* (2013.01); *B60W 2040/0818* (2013.01); *B60W 2520/10* (2013.01); *B60W 2540/10* (2013.01); *B60W 2540/12* (2013.01); *B60W 2540/18* (2013.01); *B60W 2540/26* (2013.01); *B60W 2720/106* (2013.01)

(58) Field of Classification Search
CPC ......... B60W 2420/42; B60W 2540/26; B60W 2040/0818; B60W 40/08; B60W 50/14; B60W 2540/12; B60W 30/16
See application file for complete search history.

(56) References Cited

U.S. PATENT DOCUMENTS

2005/0270145 A1 12/2005 Kataoka et al.
2013/0162794 A1 6/2013 Wakiyama
2017/0232973 A1 8/2017 Otake

FOREIGN PATENT DOCUMENTS

| JP | 2008-195402 | 8/2008 |
|---|---|---|
| JP | 2009-73462 | 4/2009 |
| JP | 2009-190464 | 8/2009 |

(Continued)

*Primary Examiner* — Redhwan K Mawari
(74) *Attorney, Agent, or Firm* — Oblon, McClelland, Maier & Neustadt LLP (57) ABSTRACT

A vehicle control apparatus includes a vehicle speed control unit for controlling the speed of a vehicle, and provisional and final anomaly determination units for determining whether or not a driver of the vehicle is in a provisional anomalous state or in a final anomalous state in which the driver has lost his/her ability to drive the vehicle. After the driver is determined to be in the provisional anomalous state, the vehicle speed control unit decelerates the vehicle at a first deceleration before the driver is determined to be in the final anomalous state. When the vehicle speed becomes lower than a second vehicle speed, the vehicle speed control unit maintains the vehicle speed at the second vehicle speed. After the driver is determined to be in the final anomalous state, the vehicle control apparatus decelerates the vehicle at a second deceleration and stops the vehicle.

4 Claims, 5 Drawing Sheets

(51) Int. Cl.
*B60W 30/18* (2012.01)
*B60W 40/08* (2012.01)

(56) References Cited

FOREIGN PATENT DOCUMENTS

| | | |
|---|---|---|
| JP | 4349210 | 10/2009 |
| JP | 2010-6279 | 1/2010 |
| JP | 2013-152700 | 8/2013 |

VEHICLE CONTROL APPARATUS

BACKGROUND OF THE INVENTION

Field of the Invention

The present invention relates to a vehicle control apparatus for controlling a vehicle upon detection of an anomalous state of a driver.

Description of the Related Art

Conventionally, there has been proposed an apparatus (hereinafter referred to as a "conventional apparatus") which determines whether or not a driver of a vehicle has fallen into an anomalous state in which the driver has lost his/her ability to drive the vehicle (for example, a state in which the driver has fallen asleep while driving or a state in which the mental and bodily functions of the driver have stopped), and decelerates the vehicle when the apparatus determines that the driver has fallen into the anomalous state (see, for example, Japanese Patent Application Laid-Open No. 2009-73462). Hereinafter, the "anomalous state in which the driver has lost his/her ability to drive the vehicle" will be also referred to as the "anomalous state" for simplicity, and the "determination as to whether or not the driver is in the anomalous state" will be also referred to as the "determination of the driver's anomaly" for simplicity.

Incidentally, the determination as to whether or not the driver is in the anomalous state" can be made by determining whether or not a situation occurring as a result of loss of the driver's ability to drive the vehicle continues over a predetermined time. Examples of the situation occurring as a result of loss of the driver's ability to drive the vehicle include a situation in which no steering operation is performed, a situation in which the amount of accelerating operation does not change, and a situation in which the amount of braking operation does not change. In the following description, such a situation will be referred to as the "particular situation".

However, in such a case, the above-mentioned predetermined time must be set to a relatively long time so as to allow reliable determination as to whether or not the driver is in the anomalous state. Meanwhile, if the predetermined time is set to a relatively long time, there may arise a case where the vehicle continues high-speed travel over a long period of time, for example, in a state where the driver has actually fallen in the anomalous state.

A conceivable measure for overcoming the above-described drawback is as follows. First, the predetermined time is set to a relatively short time (first time), and when the particular situation continues over the relatively short time, the driver is provisionally determined to be in an anomalous state (provisional anomalous determination) and deceleration of the vehicle is started. Subsequently, when the particular situation continues over a second time, the driver is finally determined to be in the anomalous state (final anomalous determination), and the vehicle is decelerated further and is stopped.

However, in the case where the vehicle speed at the time when the provisional anomalous determination was made is low, the vehicle may stop before elapse of the second time (in other words, before the driver is finally determined to be in the anomalous state). Since the stoppage of the vehicle may hinder traffic of other vehicle, it is undesirable to stop the vehicle in a state in which the driver is not in an anomalous state in actuality.

SUMMARY OF THE INVENTION

The present invention has been accomplished so as to solve the above-described problem. Namely, one object of the present invention is to provide a vehicle control apparatus which decreases the speed of a vehicle when the possibility of a driver being in an anomalous state is high and which, however, does not stop the vehicle until the driver is finally determined to be in the anomalous state and stops the vehicle after the driver is finally determined to be in the anomalous state, thereby reducing the possibility that the vehicle affects the travels of surrounding vehicles to an unnecessarily great degree.

A vehicle control apparatus of the present invention (hereinafter also referred to as the "apparatus of the present invention") comprises:

vehicle speed control means (10, 30, 31, 40, 41) for controlling vehicle speed which is speed of a vehicle;

provisional anomaly determination means (10, step 300, step 330, step 350, step 360, step 370) for determining, over a first time ($t1ref$), whether or not a driver of the vehicle is in a provisional anomalous state in which the driver possibly has lost his/her ability to drive the vehicle, when the vehicle speed is equal to or higher than a first vehicle speed (SPD0$th$); and final anomaly determination means (10, step 400, step 410, step 415, step 440, step 445) for determining, over a second time ($t2ref$), whether or not the driver is in a final anomalous state in which the driver has lost his/her ability to drive the vehicle, when the driver has been determined to be in the provisional anomalous state, wherein the vehicle speed control means is configured:

to decelerate the vehicle at a first deceleration (step 430) after a provisional anomaly determined time which is a point in time when the driver is determined to be in the provisional anomalous state;

to maintain the vehicle speed at a second vehicle speed (SPD1$th$) lower than the first vehicle speed (SPD0$th$) (step 425, step 435), when the vehicle speed becomes equal to or lower than the second vehicle speed (SPD1$th$) before the second time elapses from the provisional anomaly determined time; and to decelerate the vehicle at a second deceleration to stop the vehicle (step 500, step 510, step 520, step 530) after a final anomaly determined time which is a point in time when the driver is determined to be in the final anomalous state.

In the apparatus of the present invention, when the vehicle speed is equal to or higher than the first vehicle speed, the provisional anomaly determination means determines, over the first time, whether or not the driver of the vehicle possibly has lost his/her ability to drive the vehicle (namely, whether or not the driver is in a provisional anomalous state). This first time can be set shorter than a time required to finally determine that the driver is actually in an anomalous state. The vehicle speed control means decelerates the vehicle at the first deceleration after a point in time when the driver is determined to be in the provisional anomalous state (the provisional anomaly determined time). Accordingly, in the case where the driver is actually in an anomalous state, it is possible to prevent the vehicle from continuing a high speed travel for a long time.

Further, the final anomaly determination means determines, over the second time, whether or not the driver of the vehicle is in the final anomalous state in which the driver has lost his/her ability to drive the vehicle, when the driver has been determined to be in the provisional anomalous state. In addition, after the point in time when the driver is determined to be in the final anomalous state (the final anomaly determined time), the vehicle speed control means decelerates the vehicle at the second deceleration and stops the vehicle. As a result, in the case where the driver is actually in an anomalous state, it is possible to stop the vehicle.

However, when the vehicle speed at the provisional anomaly determined time is low, the deceleration of the vehicle at the second deceleration may result in occurrence of the case where the vehicle stops before the second time elapses after the provisional anomaly determined time (namely, before the final anomaly determination is made). In such a case, despite the driver possibly not being in the anomalous state in actuality, the vehicle is stopped and may unnecessarily hinder smooth traffic of other vehicles.

In view of the above, the vehicle speed control means maintains the vehicle speed at the second vehicle speed when the vehicle speed becomes equal to or less than the second vehicle speed before the second time elapses from the provisional anomaly determined time. As a result, the vehicle is prevented from being stopped in the case where the driver is not in an anomalous state in actuality, and the vehicle is stopped in the case where the driver is in an anomalous state in actuality. Therefore, it is possible to reduce the possibility that the vehicle unnecessarily hinders smooth traffic of other vehicles.

In one mode of the apparatus of the present invention, the magnitude ($|\alpha 2|$) of the second deceleration ($\alpha 2$) is greater than the magnitude ($|\alpha 1|$) of the first deceleration ($\alpha 1$).

In this case, the vehicle is decelerated at the first deceleration ($\alpha 1$) after the driver is determined to be in the provisional anomalous state, and is decelerated at the second deceleration ($\alpha 2$) whose magnitude is greater than that of the first deceleration ($\alpha 1$) after the driver is determined to be in the final anomalous state.

Therefore, in the above-described mode of the apparatus of the present invention, after the driver is determined to be in the final anomalous state, the vehicle can be decelerated more quickly as compared with the deceleration of the vehicle after the driver is determined to be in the provisional anomalous state. Namely, it is possible to shorten the time before the vehicle stops, to thereby quickly secure the safety of the driver and a passenger(s).

In one mode of the apparatus of the present invention, the provisional anomaly determination means is configured to determine whether or not the driver is in the provisional anomalous state by determining whether or not at least one of a situation in which no steering operation is performed for the vehicle, a situation in which an accelerator operation amount of the vehicle does not change, and a situation in which a brake operation amount of the vehicle does not change continues for the first time (t1*ref*) (step 330 to step 370); and the final anomaly determination means is configured to determine whether or not the driver is in the final anomalous state by determining whether or not at least one of the situation in which no steering operation is performed for the vehicle, the situation in which the accelerator operation amount of the vehicle does not change, and the situation in which the brake operation amount of the vehicle does not change continues for the second time (t2*ref*) after the driver has been determined to be in the provisional anomalous state (step 410, step 415, step 440, step 445).

In the above-described mode of the apparatus of the present invention, the provisional anomaly determination means determines whether or not the driver is in the provisional anomalous state by determining whether or not at least one of the situation in which no steering operation is performed for the vehicle, the situation in which the accelerator operation amount of the vehicle does not change, and the situation in which the brake operation amount of the vehicle does not change continues for the first time (t1*ref*). Similarly, the final anomaly determination means determines whether or not the driver is in the final anomalous state by determining whether or not at least one of the situation in which no steering operation is performed for the vehicle, the situation in which the accelerator operation amount of the vehicle does not change, and the situation in which the brake operation amount of the vehicle does not change continues for the second time (t2*ref*). Since at least one of the above-described three situations is used for determining whether or not the driver is in the provisional anomalous state or in the final anomalous state, reliable determination can be made without use of additional dedicated components or the like.

In the above-described mode, the final anomaly determination means is configured to determine that the driver is normal and to invalidate the determination that the driver is in the provisional anomalous state (step 450), when the situation in which the driver is determined to be in the provisional anomalous state ends (step 410) before the second time (t2*ref*) elapses from the provisional anomaly determined time.

When the situation in which the driver is determined to be in the provisional anomalous state ends before the second time (t2*ref*) elapses (before the driver is determined to be in the final anomalous state) from the point in time when the driver is determined to be in the provisional anomalous state, it can be presumed that the driver has regained the ability to drive the vehicle. Therefore, the deceleration of the vehicle continued in this state may hinder the driving operation of the driver who is presumed to be in the "normal state". Therefore, in such a case, the driver is determined to be in the normal state, and the determination that the driver is in the provisional anomalous state is invalidated. As a result, it is possible to avoid deceleration which hinders the driver's driving operation.

Notably, in the above description, in order to facilitate understanding of the present invention, the constituent elements of the invention corresponding to those of an embodiment of the invention which will be described later are accompanied by parenthesized names and/or symbols which are used in the embodiment; however, the constituent elements of the invention are not limited to those in the embodiment defined by the names and/or the symbols. Other objects, other features, and attendant advantages of the present invention will be readily appreciated from the following description of the embodiment of the invention which is made with reference to the accompanying drawings.

DESCRIPTION OF THE PREFERRED EMBODIMENT

A vehicle control apparatus (driving assist apparatus) according to an embodiment of the present invention (hereinafter referred to as the present embodiment) will be described in detail with reference to the drawings.

(Configuration)

Figure 1:
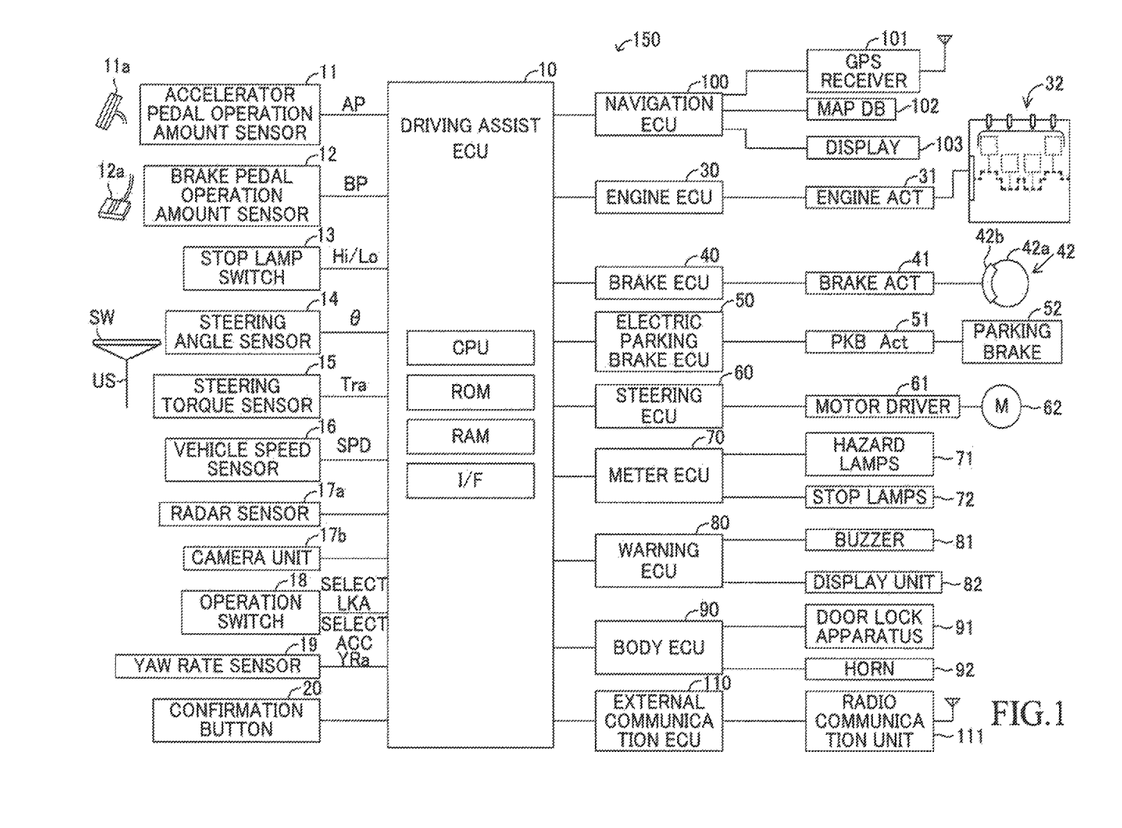
FIG. 1 is a schematic diagram of a vehicle control apparatus according to an embodiment of the present invention (present control apparatus)

As shown in FIG. 1, a vehicle control apparatus 150 according to the present embodiment (hereinafter may be referred to as the "present control apparatus") is applied to a vehicle (which may be referred to as the "own vehicle" so as to distinguish the vehicle from other vehicles). The vehicle control apparatus 150 mainly includes a driving assist ECU 10, an engine ECU 30, a brake ECU 40, an electric parking brake ECU 50, a steering ECU 60, a meter ECU 70, a warning ECU 80, a body ECU 90, a navigation ECU 100, and an external communication ECU 110.

These ECUs are electric control units each of which includes a microcomputer as a main component, and are connected each other through an unillustrated CAN (controller area network) such that the ECUs can send and receive pieces of information to and from one another. In the present specification, the microcomputer includes a CPU, a ROM, a RAM, a nonvolatile memory, an interface, etc. The CPU realizes various functions by executing instructions (programs, routines) stored in the ROM. Some or all of the ECUs may be integrated into a single ECU.

The driving assist ECU 10 is connected to sensors (including switches) listed below and receives detection signals or output signals from these sensors. Notably, each sensor may be connected to an ECU other than the driving assist ECU 10. In such a case, the driving assist ECU 10 receives, through the CAN, the detection signal or output signal of that sensor from the ECU to which that sensor is connected.

An accelerator pedal operation amount sensor 11 is configured to detect the operation amount of an accelerator pedal 11a (accelerator position) of the own vehicle and output a signal representing the accelerator pedal operation amount AP.

A brake pedal operation amount sensor 12 is configured to detect the operation amount of a brake pedal 12a of the own vehicle and output a signal representing the brake pedal operation amount BP.

A stop lamp switch 13 is configured to output a low-level signal when the brake pedal 12a is not depressed (is not operated) and output a high-level signal when the brake pedal 12a is depressed (is operated).

A steering angle sensor 14 is configured to detect the steering angle of the own vehicle and output a signal representing the steering angle $\theta$.

A steering torque sensor 15 is configured to detect the steering torque applied to a steering shaft US of the own vehicle as a result of operation of a steering wheel SW and output a signal representing the steering torque Tra.

A vehicle speed sensor 16 is configured to detect the travel speed (vehicle speed) of the own vehicle and output a signal representing the vehicle speed SPD.

A radar sensor 17a is configured to obtain information regarding a road ahead of the own vehicle and information regarding three-dimensional objects present on the road. Examples of the three-dimensional objects include moving objects such as pedestrians, bicycles, and automobiles, as well as stationary objects such as utility poles, trees, and guard rails. In the following description, these three-dimensional objects may be referred to as "targets".

The radar sensor 17a includes a radar transmission/reception section and a signal processing section, both of which are not shown. The radar transmission/reception section radiates a radio wave in the millimeter wave band (hereinafter referred to as "millimeter wave") to an area around the own vehicle, including an area located ahead of the own vehicle. The radar transmission/reception section receives a millimeter wave reflected by targets present in the radiation range (i.e., reflection wave).

Every time a predetermined time elapses, the signal processing section obtains various physical quantities regarding each detected target based on the phase difference between the transmitted millimeter wave and the received reflection wave, the level of attenuation of the reflection wave, the time between transmission of the millimeter wave and reception of the reflection wave, etc. Examples of the physical quantities include the distance (longitudinal distance) between the own vehicle and the detected target, the relative speed of the detected target, the lateral distance between the own vehicle and the detected target, and the relative lateral speed of the detected target.

A camera unit 17b includes a stereo camera and an image processing section, both of which are not shown. The stereo camera captures images of scenes in left side and right side areas in front of the vehicle and obtains data of paired left and right images (hereinafter simply referred to as the "image data"). The image processing section determines whether or not a target is present based on the image data output from the stereo camera, calculates the relative relation between the own vehicle and the target based on the image data, and outputs the results of the determination and the calculation.

Notably, the driving assist ECU 10 is configured to calculate the relative relation between the own vehicle and the target (target information) by combining the relative relation between the own vehicle and the target obtained by the radar sensor 17a and the relative relation between the own vehicle and the target obtained by the camera unit 17b. Further, the driving assist ECU 10 is configured to recognize white-line lane markers (hereinafter simply referred to as "white lines") on the left and right sides of the road, based on the image data (road image data) output from the camera unit 17b, and obtain the shape of the road (the radius of curvature representing the degree of curvature of the road), the positional relation between the road and the vehicle, etc.

Operation switches 18 are switches operated by the driver. By operating one of the operation switches 18, the driver can start and stop execution of lane keeping control (LKA: lane keeping assist control). Further, by operating another of the operation switches 18, the driver can start and stop execution of follow-up inter-vehicle distance control (ACC: adaptive cruise control).

A yaw rate sensor 19 is configured to detect the yaw rate of the own vehicle and output a signal representing the actual yaw rate YRa.

A confirmation button 20 is disposed at a position where the driver can operate the confirmation button 20 and is configured to output a low-level signal when it is not operated and output a high-level signal when it is pushed.

The driving assist ECU 10 is configured to execute LKA and ACC. Further, as will be described later, the driving assist ECU 10 is configured to execute various types of controls so as to determine whether or not the driver is in an anomalous state (namely, a provisional anomalous state or a final anomalous state, which will be described later) in which the driver has lost his/her ability to drive the vehicle and to execute proper processing when the driving assist ECU 10 determines that the driver is in the anomalous state.

The engine ECU 30 is connected to an engine actuator 31. The engine actuator 31 is an actuator for changing the operation state of an internal combustion engine 32. In the present example, the internal combustion engine 32 is a gasoline-fuel injection, spark-ignition-type multicylinder engine and has a throttle valve for adjusting the amount of intake air. The engine actuator 31 includes at least a throttle valve actuator for changing the degree of opening of the throttle valve. The engine ECU 30 can change the torque generated by the internal combustion engine 32 by driving the engine actuator 31. The torque generated by the internal combustion engine 32 is transmitted to unillustrated drive wheels through an unillustrated transmission. Accordingly, the engine ECU 30 can control the drive force of the own vehicle by controlling the engine actuator 31, to thereby change the accelerating state (acceleration) of the own vehicle.

The brake ECU 40 is connected to a brake actuator 41. The brake actuator 41 is provided in a hydraulic circuit extending between an unillustrated master cylinder which pressurizes hydraulic oil by using the depressing force applied to the brake pedal and friction brake mechanisms 42 provided in front left, front right, rear left, and rear right wheels. Each of the friction brake mechanisms 42 includes a brake disc 42a fixed to a wheel and a brake caliper 42b fixed to the body of the vehicle. The brake actuator 41 adjusts the pressure of oil supplied to a wheel cylinder incorporated into the brake caliper 42b in accordance with an instruction from the brake ECU 40 and operates the wheel cylinder by using the oil pressure so as to press a brake pad against the brake disc 42a to thereby generate a frictional braking force.

The electric parking brake ECU (hereinafter may be referred to as the "EPB ECU") 50 is connected to a parking brake actuator (hereinafter may be referred to as the "PKB actuator") 51. The PKB actuator 51 is an actuator for pressing the brake pad against the brake disc 42a. In the case where the vehicle has a drum brake, the PKB actuator 51 is an actuator for pressing a brake shoe against a drum which rotates together with a wheel. Accordingly, the EPB ECU 50 can apply a parking brake force to the wheel by using the PKB actuator 51, to thereby maintain the vehicle in a stopped state.

The steering ECU 60 is a controller of a well known electric power steering system and is connected to a motor driver 61. The motor driver 61 is connected to a steering motor 62. The steering motor 62 is embedded in an unillustrated "steering mechanism of the vehicle which includes a steering wheel, a steering shaft connected to the steering wheel, a steering gear mechanism, etc". The steering motor 62 generates torque by using electric power supplied from the motor driver 61. This torque makes it possible to apply steering assist torque and to turn the left and right steerable wheels of the vehicle.

The meter ECU 70 is connected to an unillustrated digital-display-type meter and is also connected to hazard lamps 71 and stop lamps 72. The meter ECU 70 can blink the hazard lamps 71 and turn on the stop lamps 72 in accordance with instructions from the driving assist ECU 10.

The warning ECU 80 is connected to a buzzer 81 and a display unit 82. In accordance with instructions from the driving assist ECU 10, the warning ECU 80 can sound the buzzer 81 so as to call the driver's attention, and can turn on a mark (e.g., a warning lamp) for calling the driver's attention on the display unit 82, display a warning message on the display unit 82, and/or display the operation state of the driving assist control on the display unit 82.

The body ECU 90 is connected to a door lock apparatus 91 and a horn 92. The body ECU 90 can release the door lock apparatus 91 in accordance with an instruction from the driving assist ECU 10. The body ECU 90 can sound the horn 92 in accordance with an instruction from the driving assist ECU 10.

The navigation ECU 100 is connected to a GPS receiver 101 which receives GPS signals for detecting the present position of the own vehicle, a map database 102 which stores map information or the like, a touch-panel-type display 103 which is a human-machine interface, etc. The navigation ECU 100 determines the position of the own vehicle at the present point in time on the basis of the GPS signals. The navigation ECU 100 executes various types of computation processing based on the position of the own vehicle and the map information or the like stored in the map database 102 and executes route guidance by using the display 103.

The external communication ECU 110 is connected to a radio communication unit 111. The external communication ECU 110 and the radio communication unit 111 are radio communication terminals for connection to an external network system.

<Outline of Operation>

Next, the outline of operation of the present control apparatus will be described with reference to FIG. 2A and FIG. 2B. In the case where the speed of the vehicle is equal to or higher than a first vehicle speed (SPD0th: a provisional anomaly determination permission vehicle speed), the present control apparatus determines that the possibility (suspicion) of the driver being in an "anomalous state in which the driver has lost his/her ability to drive the vehicle" has become higher, when a state in which the driver performs no driving operation (no-driving-operation state) continues for a first time (t1ref: a provisional anomaly determining time) or more. Namely, in such a case, the present control apparatus determines that the driver is in a "provisional anomalous state" (see time t2 of FIG. 2A). As described above, the present control apparatus determines, over a first time (the provisional anomaly determining time), whether or not the driver is in the provisional anomalous state. Subsequently, as shown by a continuous line C1 of FIG. 2A, the present control apparatus decreases the vehicle speed SPD at a predetermined deceleration α1 (first deceleration) from time t2 at which the driver is determined to be in the "provisional anomalous state".

Figure 2A:
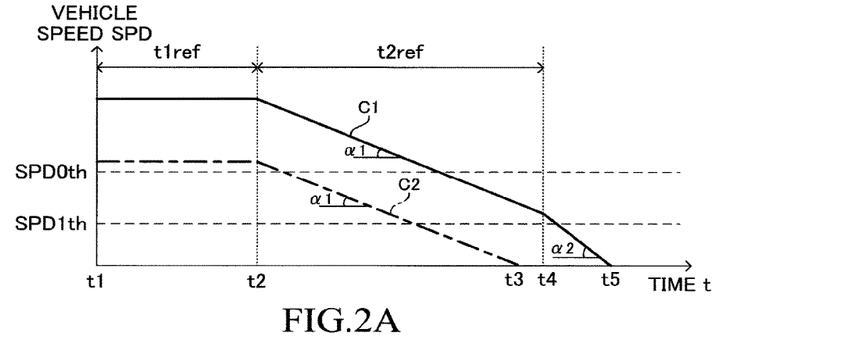
FIGS. 2A and 2B are time charts each showing a temporal change in vehicle speed controlled by the embodiment of the present invention.

Further, in a state in which the driver has been determined to be in the provisional anomalous state (after time t2 of FIG. 2(A)), the present control apparatus determines that the "driver has fallen into the anomalous state in which the driver has lost his/her ability to drive the vehicle" when the state in which the driver performs no driving operation (no-driving-operation state) continues for a second time (t2ref: a final anomaly determining time) or more. Namely, in such a case, the present control apparatus determines that the driver is in a "final anomalous state" (see time t4 of FIG.

2A). As described above, the present control apparatus determines, over a second time (the final anomaly determining time), whether or not the driver is in the final anomalous state. Subsequently, as shown by the continuous line C1 of FIG. 2A, the present control apparatus decreases the vehicle speed SPD at a predetermined deceleration α2 (second deceleration) from time t4 at which the driver is determined to be in the "final anomalous state" and stops the vehicle (see time t5). Notably, in the present example, the magnitude of the deceleration α2 is greater than that of the deceleration α1.

However, in the case where the vehicle speed at the point in time (time t2) when the provisional anomaly determination was made is low as indicated by a long dashed and short dashed line C2 of FIG. 2A, if the vehicle is decelerated at the deceleration α1 from that point in time (time t2), the vehicle speed reaches "0" (the vehicle stops) at time t3 which is a point in time before elapse of the final anomaly determining time t2ref from that point in time (time t2).

At time t3, the present apparatus has not yet finally determined that the driver is in the anomalous state. Namely, at time t3, the present apparatus has not yet determined that the driver is in the "final anomalous state". The vehicle stopped on a road in such a state may become an obstacle for other vehicles travelling on that road.

Figure 2B:
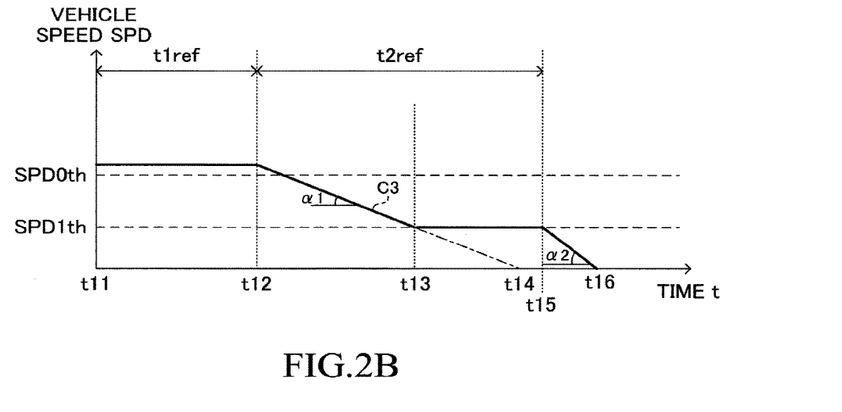

In order to solve such a problem, as indicated by a continuous line C3 of FIG. 2B, in the case where the vehicle speed SPD becomes less than a second vehicle speed (SPD1th) before the final anomaly determining time t2ref elapses from the point in time when the driver has been determined to be in the provisional anomalous state, the present control apparatus maintains the speed SPD of the vehicle at the second vehicle speed (SPD1th). Subsequently, the present apparatus decelerates the vehicle at the predetermined deceleration α2 from a "final anomaly determined time (see time t15 of FIG. 2B)" at which the driver is determined to be in the "final anomalous state" and stops the vehicle (see time t16). As a result, since the own vehicle is not stopped before the final anomaly determination is made, the possibility of the own vehicle hindering traffic of other vehicles can be decreased. Notably, in the case where the driver performs some kind of driving operation (namely, the situation in which the driver is determined to be in the provisional anomalous state ends) in the period between the point in time when the driver has been determined to be in the provisional anomalous state and the point in time when the driver is determined to be in the final anomalous state, the present control apparatus determines that the driver is in the normal state, invalidates the determination that the driver is in the provisional anomalous state, and stops deceleration of the vehicle.

<Outline of Control Processing>

Next, the outline of control processing executed by the present control apparatus will be described. When the driver is driving the vehicle, the driving assist ECU 10 provided in the present control apparatus repeatedly determines (monitors) whether or not the "driver is in the anomalous state in which the driver has lost his/her ability to drive the vehicle". The driving assist ECU 10 determines the state (one of three stages; i.e., the "normal state", the "provisional anomalous state", and the "final anomalous state") in which the driver is, based on the result of monitoring of the state of the driver.

The driving assist ECU 10 makes one of a "normal-time routine," a "provisional-anomaly-time routine", and a "final-anomaly-time routine" function in actuality, in accordance with the state of the driver.

Each of the routines is executed every time a predetermined time elapses. However, in the case where the driver is determined to be in the normal state, although the "normal-time routine" functions in actuality, neither the "provisional-anomaly-time routine" nor the "final-anomaly-time routine" functions in actuality. In the case where the driver is determined to be in the provisional anomalous state, although the "provisional-anomaly-time routine" functions in actuality, neither the "normal-time routine" nor the "final-anomaly-time routine" functions in actuality. Further, in the case where the driver is determined to be in the final anomalous state, although the "final-anomaly-time routine" functions in actuality, neither the "normal-time routine" nor the "provisional-anomaly-time routine" functions in actuality.

The driving assist ECU 10 executes the "normal-time routine" at predetermined intervals when the driver is driving the vehicle. In the "normal-time routine", the driving assist ECU 10 determines whether or not the state of the driver at the present point in time is the "normal state". For example, the driving assist ECU 10 determines whether the driver is in the "normal state" or in the "provisional anomalous state" by determining whether or not the driver performs any driving operation within a predetermined time t1ref when the vehicle is travelling at a speed equal to or higher than a predetermined vehicle speed SPD0th. In the case where the driver performs no driving operation within the predetermined time t1ref when the vehicle is travelling at the speed equal to or higher than the predetermined vehicle speed SPD0th, the driving assist ECU 10 determines that the state of the driver is the "provisional anomalous state" and then makes the "provisional-anomaly-time routine" function in actuality. Notably, the specific process of the "normal-time routine" will be described in detail later. Similarly, the driving operation of the driver will be described in detail later.

Once the driver is determined to be in the "provisional anomalous state", the "provisional-anomaly-time routine" functions. In the "provisional-anomaly-time routine", the driving assist ECU 10 provides a "warning" and "maintains/decreases the vehicle speed". Here, the "warning" means an operation of warning the driver and a passenger(s) that the driver is highly likely to be in the anomalous state by generating a sound or a blinking a lamp. The "maintains/decreases the vehicle speed" means an operation of maintaining the speed of the vehicle at the present point in time and decreasing the vehicle speed at a predetermined deceleration (first deceleration α1). In the "provisional-anomaly-time routine", when the vehicle speed reaches a predetermined vehicle speed (second vehicle speed SPD1th) during deceleration of the vehicle, the driving assist ECU 10 controls the vehicle speed so as to maintain the second vehicle speed to thereby prevent the vehicle from stopping.

After the above-described operation of "warning" and "maintaining/decreasing the vehicle speed" has been provided in the provisional-anomaly-time routine", the driver may become aware of the "warning" or the "vehicle speed maintaining/decreasing". In such a case, the driver performs some kind of driving operation, and such driving operation is detected within the predetermined time t2ref. In this case, the driving assist ECU 10 returns the state of the driver at the present point in time from the "provisional anomalous state" to the "normal state". In this case, the "provisional-anomaly-time routine" does not function in actuality, and the "normal-time routine" functions again. Accordingly, the operation of "warning" and "maintaining/decreasing the vehicle speed" which has been provided up to the present is ended.

Meanwhile, in the case where no driver's driving operation is detected within the predetermined time t2ref in spite of providing "warning" and "maintaining/decreasing the vehicle speed", the possibility that the driver is in the anomalous state is very high. Therefore, in the above-described case, the driving assist ECU 10 determines that the state of the driver is the "final anomalous state". Notably, the specific process of the "provisional-anomaly-time routine" will be described in detail later.

Once the driver is determined to be in the "final anomalous state", the "final-anomaly-time routine" functions.

In the "final-anomaly-time routine", the driving assist ECU 10 gradually decelerates the vehicle at a predetermined deceleration (second deceleration $\alpha2$) to thereby stop the vehicle. Further, during the deceleration, the driving assist ECU 10 turns on the stop lamps and blinks the hazard lamps to thereby urge the drivers of surrounding vehicles to pay attention to the vehicle. In addition, when the vehicle stops, the driving assist ECU 10 makes the EPB (electric parking brake) work, blinks the hazard lamps, releases the door locks, urges the drivers of surrounding vehicles to pay attention to the vehicle, and secures the safety of the driver and passenger(s) of the vehicle.

<Specific Operation>

Next, specific process of the CPU of the driving assist ECU 10 (hereinafter may be simply referred to as the "CPU"). Every time a predetermined time elapses, the CPU executes routines represented by flowcharts in FIGS. 3 through 5.

Figure 3:
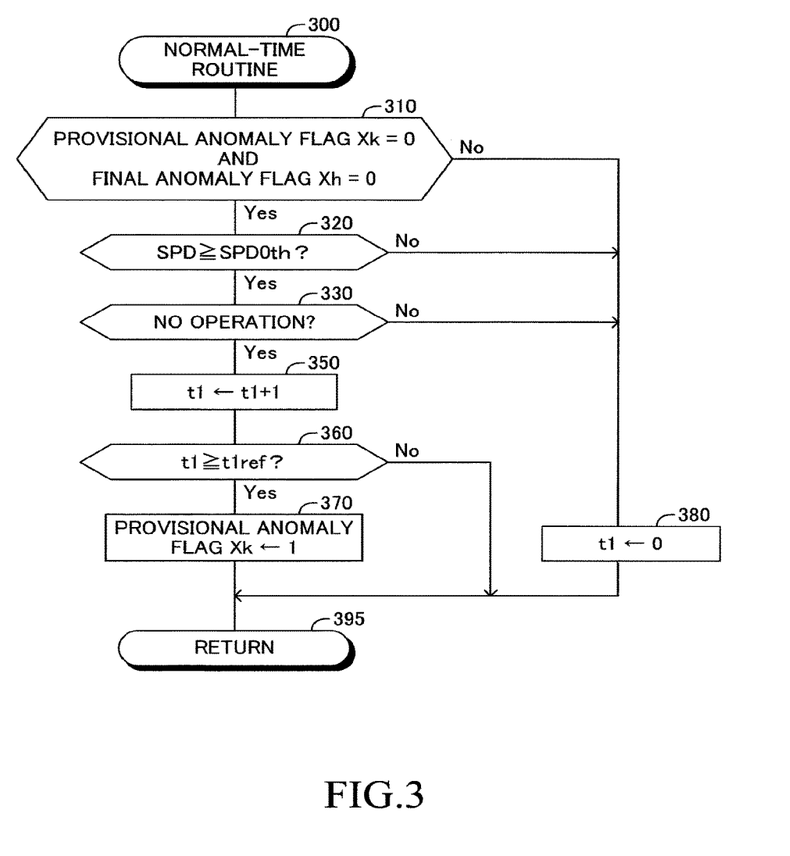
FIG. 3 is a flowchart showing a normal-time routine executed by a driving assist ECU shown in FIG. 1.
Figure 4:
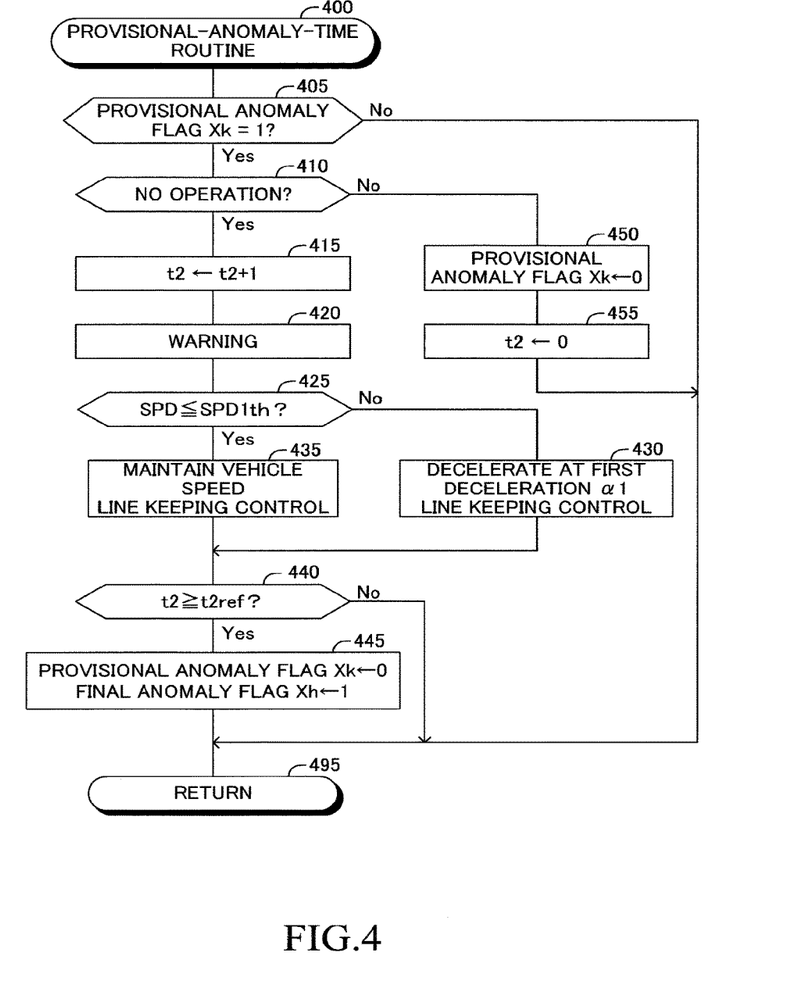
FIG. 4 is a flowchart showing a provisional-anomaly-time routine executed by the driving assist ECU shown in FIG. 1.
Figure 5:
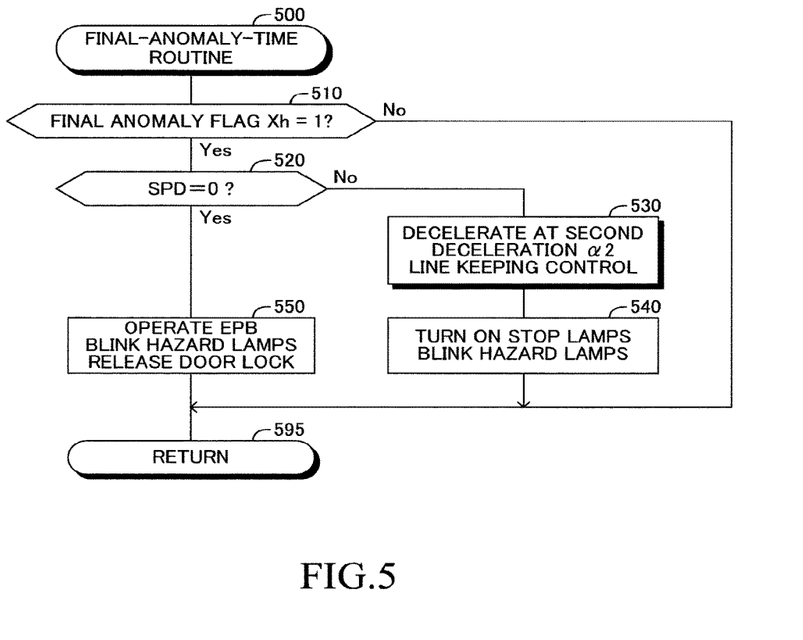
FIG. 5 is a flowchart showing a final-anomaly-time routine executed by the driving assist ECU shown in FIG. 1.

The CPU monitors the state of the driver and determines, based on the result of the monitoring, the state of the driver (the "normal state", the "provisional anomalous state", or the "final anomalous state"). In accordance with the determined state, the CPU then sets the values of a provisional anomaly flag Xk and a final anomaly flag Xh and controls the travel state of the vehicle.

The provisional anomaly flag Xk represents that the state of the driver at the present point in time is the "provisional anomalous state" when its value is "1". The final anomaly flag Xh represents that the state of the driver at the present point in time is the "final anomalous state" when its value is "1". In the case where both the values of the provisional anomaly flag Xk and the final anomaly flag Xh are "0", it represents that the state of the driver at the present point in time is the "normal state". The values of the provisional anomaly flag Xk and the final anomaly flag Xh are set to "0" in an initial routine which is executed by the CPU when an unillustrated ignition key switch mounted on the vehicle is moved from its off position to its on position.

In the case where the ignition key switch is in the on position, the routines of FIGS. 3 through 5 are started every time a predetermined period of time elapses. In this case, since the provisional anomaly flag Xk and the final anomaly flag Xh have been initialized (Xk=0, Xh=0), in actuality, the normal-time routine of FIG. 3 functions.

When a predetermined timing has come, the CPU starts the normal-time routine of FIG. 3 from step 300 and proceeds to step 310 so as to determine whether or not both the values of the provisional anomaly flag Xk and the final anomaly flag Xh are "0".

Here, it is assumed that the present point in time is immediately after the ignition key switch has been turned on. In this case, the provisional anomaly flag Xk and the final anomaly flag Xh have been initialized, and both the values of the provisional anomaly flag Xk and the final anomaly flag Xh are "0". Therefore, the CPU makes a "Yes" determination in step 310 and proceeds to step 320 so as to determine whether or not the vehicle speed SPD is equal to or greater than a provisional anomaly determination permission vehicle speed SPD0th set in advance.

In the case where the vehicle speed SPD is equal to or greater than the provisional anomaly determination permission vehicle speed SPD0th, the CPU makes a "Yes" determination in step 320 and proceeds to step 330 so as to determine whether or not the driver is in a state in which the driver performs no driving operation (no-driving-operation state).

In the present example, the state in which the driver performs no driving operation is a state in which all of the following condition 1 through condition 3 are satisfied. In other words, when any one of the following condition 1 through condition 3 is not satisfied, the CPU determines that some kind of driving operation has been performed.

(Condition 1) The steering torque Tra detected by the steering torque sensor 15 is "0".

(Condition 2) The accelerator pedal operation amount AP detected by the accelerator pedal operation amount sensor 11 does not change within a predetermined period of time. Namely, the magnitude of the difference between APold which is the accelerator pedal operation amount AP at the time of the previous execution of the present routine and APnow which is the accelerator pedal operation amount AP at the time of the latest execution of the present routine is equal to or less than a very small value $\Delta A$. Namely, the values of APold and APnow are substantially equal to each other.

(Condition 3) The brake pedal operation amount BP detected by the brake pedal operation amount sensor 12 does not change within a predetermined period of time. Namely, the magnitude of the difference between BPold which is the brake pedal operation amount BP at the time of the previous execution of the present routine and BPnow which is the brake pedal operation amount BP at the time of the latest execution of the present routine is equal to or less than a very small value $\Delta B$. Namely, the values of BPold and BPnow are substantially equal to each other.

In the case where it is determined in step 330 that the driver performs no driving operation, the CPU makes a "Yes" determination in step 330 and proceeds to step 350 so as to increase the value of a provisional anomaly determination timer t1 by "1". The value of the provisional anomaly determination timer t1 represents a period of time over which the no-driving-operation state continues when the vehicle speed SPD is equal to or greater than the provisional anomaly determination permission vehicle speed SPD0th.

Subsequently, the CPU proceeds to step 360 so as to determine whether or not the value of the provisional anomaly determination timer t1 is equal to or greater than a provisional anomaly determining time t1ref set in advance. The provisional anomaly determining time t1ref is set to an appropriate time within the range of, for example, 5 sec. to 30 sec. Notably, the value of the provisional anomaly determination timer is set to "0" in the above-described initial routine.

In the case where the value of the provisional anomaly determination timer t1 is less than the provisional anomaly determining time t1ref, the CPU makes a "No" determination in step 360 and proceeds directly to step 395 so as to end the current execution of the present routine. In contrast, in the case where the value of the provisional anomaly determination timer t1 is equal to or greater than the provisional anomaly determining time t1ref, the CPU makes a "Yes" determination in step 360 and proceeds to step 370 so as to set the value of the provisional anomaly flag Xk to "1".

Subsequently, the CPU proceeds to step 395 so as to end the current execution of the present routine.

Notably, in the case where the value of the provisional anomaly flag Xk or the value of the final anomaly flag Xh is "1" when the CPU executes the processing of step 310, the CPU makes a "No" determination in step 310 and proceeds to step 380 so as to set the value of the provisional anomaly determination timer t1 to "0". Subsequently, the CPU proceeds to step 395 so as to end the current execution of the present routine.

Further, in the case where the vehicle speed SPD is less than the provisional anomaly determination permission vehicle speed SPD0th when the CPU executes the processing of step 320, the CPU makes a "No" determination in step 320 and proceeds to step 380 so as to set the value of the provisional anomaly determination timer t1 to "0". Subsequently, the CPU proceeds to step 395 so as to end the current execution of the present routine.

In addition, in the case where the driver is performing some kind of driving operation when the CPU executes the processing of step 330, the CPU makes a "No" determination in step 330 and proceeds to step 380 so as to set the value of the provisional anomaly determination timer t1 to "0". Subsequently, the CPU proceeds to step 395 so as to end the current execution of the present routine.

In general, in the case where the driver is in the normal state and the vehicle speed SPD is equal to or greater than the provisional anomaly determination permission vehicle speed SPD0th, the possibility that the no-driving-operation state continues over the provisional anomaly determining time t1ref is small. Accordingly, through the above-described processing, when the no-driving-operation state continues over the provisional anomaly determining time t1ref in the state in which the vehicle speed SPD is equal to or greater than the provisional anomaly determination permission vehicle speed SPD0th, the CPU determines that the driver is highly likely to be in the anomalous state (namely, the driver is in the provisional anomalous state) and sets the value of the provisional anomaly flag Xk to "1".

Meanwhile, when a predetermined timing has come, the CPU starts a provisional-anomaly-time routine of FIG. 4 from step 400 and proceeds to step 405 so as to determine whether or the value of the provisional anomaly flag Xk is "1".

In the case where the value of the provisional anomaly flag Xk is "0", the CPU makes a "No" determination in step 405 and proceeds directly to step 495 so as to end the current execution of the present routine. In contrast, in the case where the value of the provisional anomaly flag Xk is "1", the CPU makes a "Yes" determination in step 405 and proceeds to step 410 so as to determine whether or not the driver is in a state in which the driver performs no driving operation (no-driving-operation state) in the same manner as in step 330.

In the case where the driver is performing some kind of driving operation, the CPU makes a "No" determination in step 410 and proceeds to step 450 so as to set the value of the provisional anomaly flag Xk to "0". Subsequently, the CPU proceeds to step 455 so as to set the value of a final anomaly determination timer t2 to "0". Subsequently, the CPU proceeds directly to step 495 so as to end the current execution of the present routine. Notably, the value of the final anomaly determination timer t2 is set to "0" in the above-described initial routine. In contrast, in the case where the driver performs no driving operation, the CPU makes a "Yes" determination in step 410 and proceeds to step 415 so as to increase the value of the final anomaly determination timer t2 by "1". Subsequently, the CPU proceeds to step 420. Notably, the value of the final anomaly determination timer t2 represents the time over which the no-driving-operation state continues in the state in which the value of the provisional anomaly flag Xk is "1".

In step 420, the CPU instructs the warning ECU 80 to generate, as a "warning", a warning sound for calling attention within the vehicle compartment through use of the buzzer 81. This "warning" notifies the driver and the passenger(s) within the vehicle compartment of the possibility that the driver has some kind of problem (anomaly).

Next, the CPU proceeds to step 425 so as to determine whether or not the vehicle speed SPD is equal to or less than a final anomaly determination permission vehicle speed SPD1th set in advance. Notably, the final anomaly determination permission vehicle speed SPD1th is set to a value lower than the provisional anomaly determination permission vehicle speed SPD0th.

In the case where the vehicle speed SPD is higher than the final anomaly determination permission vehicle speed SPD1th, the CPU makes a "No" determination in step 425 and proceeds to step 430. In step 430, the CPU gradually decreases the vehicle speed such that the deceleration of the vehicle becomes equal to a predetermined first deceleration α1 (negative acceleration). Namely, the CPU sends to the engine ECU 30 and the brake ECU 40 an instruction signal which indicates that the first deceleration α1 has been set as a target deceleration. The engine ECU 30 and the brake ECU 40 control the engine actuator 31 and the brake actuator 41, respectively, such that the actual deceleration (the amount of change in the vehicle speed SPD per unit time) coincides with the first deceleration α1. Further, in the case where lane keeping control (LKA: lane keeping assist control) is not executed, in step 430, the CPU sends an instruction signal to the steering ECU 60 so as to instruct the steering ECU 60 to execute the lane keeping control. Notably, the lane keeping control will be described later. Subsequently, the CPU proceeds to step 440.

In contrast, in the case where the vehicle speed SPD is equal to or less than the final anomaly determination permission vehicle speed SPD1th, the CPU makes a "Yes" determination in step 425, proceeds to step 435 so as to maintain the vehicle speed at that point in time, and then proceeds to step 440. Namely, in step 435, the CPU sends to the engine ECU 30 and the brake ECU 40 an instruction signal which indicates that the vehicle speed at the present (i.e., the final anomaly determination permission vehicle speed SPD1th) has been set as a target vehicle speed. The engine ECU 30 and the brake ECU 40 control the engine actuator 31 and the brake actuator 41, respectively, such that the actual vehicle speed SPD coincides with the final anomaly determination permission vehicle speed SPD1th. Notably, in step 435 as well, the CPU executes the lane keeping control which will be described later.

In step 440, the CPU determines whether or not the value of the final anomaly determination timer t2 is equal to or greater than a final anomaly determining time t2ref set in advance.

In the case where the value of the final anomaly determination timer t2 is less than the final anomaly determining time t2ref, the CPU makes a "No" determination in step 440 and proceeds directly to step 495 so as to end the current execution of the present routine. In contrast, in the case where the value of the final anomaly determination timer t2 is equal to or greater than the final anomaly determining time t2ref, the CPU makes a "Yes" determination in step 440 and proceeds to step 445 so as to set the value of the provisional anomaly flag Xk to "0" and set the value of the final anomaly flag Xh to "1". Subsequently, the CPU proceeds to step 495 so as to end the current execution of the present routine.

The timing at which the CPU sets the value of the final anomaly flag Xh to "1" is the timing at which the determination that the driver is in the anomalous state in which the driver has lost his/her ability to drive the vehicle is finalized (the driver is finally determined to be in the anomalous state). In the case where the value of the provisional anomaly flag Xk is set to "0" and the value of the final anomaly flag Xh is set to "1", the CPU makes a "No" determination in step 310 of the normal-time routine and in step 405 in the provisional-anomaly-time routine and proceeds directly to step 395 and step 495, respectively. Namely, in the case where the value of the provisional anomaly flag Xk is set to "0" and the value of the final anomaly flag Xh is set to "1", the processing of the normal-time routine and the processing of the provisional-anomaly-time routine do not function in actuality.

Here, the lane keeping control (LKA: lane keeping assist control) executed in step 430 and step 435 will be described. In the case where the lane keeping control (LKA: lane keeping assist control) is not executed when the state of the driver is set to the "provisional anomalous state", the driving assist ECU 10 starts the lane keeping control. The lane keeping control is control for assisting the steering operation of the driver by applying steering torque to the steering mechanism such that the position of the own vehicle is maintained near a target travel line within a "lane (travel lane) in which the own vehicle is travelling". The lane keeping control itself is known (see, for example, Japanese Patent Application Laid-Open Nos. 2008-195402, 2009-190464, and 2010-6279, and Japanese Patent No. 4349210).

More specifically, the driving assist ECU 10 recognizes (obtains) the "left white line LL and the right white line LR" of the lane in which the own vehicle is travelling, on the basis of the image data transmitted from the camera unit 17b. The driving assist ECU 10 determines the central position between the two white lines as a target travel line Ld. Further, the driving assist ECU 10 calculates the curve radius (curvature radius) R of the target travel line Ld and the position and direction of the own vehicle in the travel lane which is delimited by the left white line LL and the right white line LR.

The driving assist ECU 10 then calculates the distance Dc between the target travel line Ld and the center of the front end of the own vehicle in the road width direction (hereinafter referred to as the "center distance Dc") and the angle θy of deviation between the direction of the target travel line Ld and the moving direction of the own vehicle (hereinafter referred to as the "yaw angle θy").

Further, the driving assist ECU 10 calculates a target yaw rate YRc*, at predetermined calculation intervals, in accordance with the following equation (1), the center distance Dc, the yaw angle θy, and the road curvature ν (=1/the curvature radius R). In equation (1), K1, K2, and K3 are control gains. The target yaw rate YRc* is a yaw rate set such that the own vehicle can travel along the target travel line Ld.

$$YRc^* = K1 \times Dc + K2 \times \theta y + K3 \times \nu \tag{1}$$

The driving assist ECU 10 calculates a target steering torque Tr* for obtaining the target yaw rate YRc* at the predetermined computation intervals, based on the target yaw rate YRc* and the actual yaw rate YRa. More specifically, a lookup table which prescribes the relation between the target steering torque Tr* and the deviation of the actual yaw rate YRa from the target yaw rate YRc* is stored in the driving assist ECU 10 in advance. The driving assist ECU 10 calculates the target steering torque Tr* by applying the deviation of the actual yaw rate YRa (from the target yaw rate YRc*) to the table. Subsequently, the driving assist ECU 10 controls the steering motor 62 through use of the steering ECU 60 such that the actual steering torque Tra coincides with the target steering torque Tr*. The above is the outline of the lane keeping control.

Notably, in the case where the value of the provisional anomaly flag Xk is "1", or the value of the final anomaly flag Xh is "1", the driving assist ECU 10 automatically executes the lane keeping control (LKA). Namely, even in the case where execution of the lane keeping control is not selected by the operation switch 18, the driving assist ECU 10 forcedly executes the lane keeping control. Accordingly, even when the driver performs no steering operation, the own vehicle can be caused to travel along the target travel line (the central position between the left and right white lines). Further, in the case where the value of the provisional anomaly flag Xk is "1", or the value of the final anomaly flag Xh is "1", the driving assist ECU 10 stops the follow-up inter-vehicle distance control (ACC) even when execution of the follow-up inter-vehicle distance control (ACC) is selected by the operation switch 18. However, in the case where the inter-vehicle distance between the own vehicle and a vehicle traveling ahead of the own vehicle is likely to become less than an allowable distance, in spite of whether or not ACC is executed, the driving assist ECU 10 controls the deceleration of the own vehicle such that the inter-vehicle distance does not become less than the allowable distance.

Next, a final-anomaly-time routine will be described with reference to FIG. 5. When a predetermined timing has come, the CPU starts the final-anomaly-time routine of FIG. 5 from step 500 and proceeds to step 510 so as to determine whether or the value of the final anomaly flag Xh is "1".

In the case where the value of the final anomaly flag Xh is "0", the CPU makes a "No" determination in step 510 and proceeds directly to step 595 so as to end the current execution of the present routine. In contrast, in the case where the value of the final anomaly flag Xh is "1", the CPU makes a "Yes" determination in step 510 and proceeds to step 520 so as to determine whether or not the vehicle speed SPD is 0 (namely, whether or not the vehicle has stopped).

In the case where the vehicle speed SPD is greater than 0 (namely, the vehicle has not yet stopped), the CPU makes a "No" determination in step 520 and proceeds to step 530. In step 530, the CPU sets the deceleration of the vehicle to the second deceleration α2 (namely, such that the vehicle is gradually decelerated) and executes the above-described lane keeping control (LKA), and then proceeds to step 540. In step 540, the CPU sends an instruction signal to the meter ECU 70 so as to instruct the meter ECU 70 to turn on the stop lamps and blink the hazard lamps. After that, the CPU proceeds to step 595 so as to end the current execution of the present routine.

In contrast, in the case where the vehicle speed SPD is 0, the CPU makes a "Yes" determination in step 520 and proceeds to step 550. In step 550, the CPU sends an instruction signal to the electric parking brake ECU 50 so as to instruct the electric parking brake ECU 50 to operate the EPB through use of the PKB actuator. Further, in step 550, the CPU sends an instruction signal to the meter ECU 70 so as to instruct the meter ECU 70 to blink the hazard lamps and an instruction signal to an unillustrated door lock ECU so as to instruct the door lock ECU to release the door lock. Subsequently, the CPU proceeds to step 595 so as to end the current execution of the present routine.

Notably, in the present embodiment, the magnitude of the second deceleration α2 is set to be greater than that of the first deceleration α1. As a result, the vehicle can be decelerated more quickly as compared with the case of the provisional-anomaly-time routine.

As described above, in the present control apparatus, after the driver has been determined by the provisional anomaly determination means to be in the provisional anomalous state in which the driver possibly has lost his/her ability to drive the vehicle (the provisional anomaly determination), the vehicle is decelerated at the first deceleration; and in the case where the vehicle speed becomes equal to or lower than the second vehicle speed SPD1*th* before the final anomaly determination is made (namely, before the second time elapses from the provisional anomaly determined time), the vehicle speed is controlled such that the vehicle speed is maintained at the second vehicle speed (step 435). Subsequently, after the driver is determined to be in the final anomalous state in which the driver has lost his/her ability to drive the vehicle (the final anomaly determination), the vehicle is decelerated at the second deceleration and is stopped.

In this manner, the present control apparatus controls the vehicle speed by categorizing the anomalous state of the driver into the final anomalous state (the state in which the driver is finally determined to be in the anomalous state) and the provisional anomalous state (the state in which the driver is provisionally determined to be in the anomalous state within a relatively short period of time). Namely, during a period in which the driver is determined to be in the provisional anomalous state before being determined to be in the final anomalous state, the present control apparatus maintains/decreases the vehicle speed so that the vehicle travels without being stopped. Accordingly, the own vehicle is never stopped before the final anomaly determination is made. Therefore, it is possible to reduce the possibility that the own vehicle affects the travels of surrounding vehicles; for example, the own vehicle hinders traffic of other vehicles around the own vehicle. Therefore, during the period between the point in time when the driver is determined to be in the provisional anomalous state and the point in time when the driver is determined to be in the final anomalous state, it is possible to reduce the possibility that the own vehicle affects the travels of surrounding vehicles.

The present invention is not limited to the above-described embodiment, and various modifications can be employed without departing from the scope of the invention. For example, the "warning" is not limited to warning sound, and may be provided through use of other methods; for example, by providing an announcement within the vehicle compartment, by blinking a warning lamp within the vehicle compartment, or by providing some kind of warning display.

Further, a so-called "driver monitoring technique" disclosed in, for example, Japanese Patent Application Laid-Open No. 2013-152700 may be employed as the anomaly determination means for determination of the driver's anomaly. More specifically, the driver is photographed by a camera provided on a member (e.g., a steering wheel, a pillar, or the like) within the vehicle compartment, and the direction in which the driver is looking or the direction of the face of the driver is monitored through use of the image shot by the camera. The CPU may determine that the driver is in the provisional anomalous state in the case where, for a predetermined time (t1*ref*) or longer, the driver is continuously looking, or the driver's face continuously faces, toward a direction toward which the driver is not looking or the driver's face does not face over a long period of time during ordinary driving of the vehicle. Further, in the provisional-anomaly-time routine, the CPU may determine that the driver is in the final anomalous state in the case where, for a predetermined time (t2*ref*) or longer, the driver is continuously looking, or the driver's face continuously faces, toward a direction toward which the driver is not looking or the driver's face does not face over a long period of time during ordinary driving of the vehicle, even through the "warning" and the deceleration of the vehicle have been provided.

In addition, the CPU may be configured to prompt the driver to push the confirmation button 20 by using the buzzer 81, the display unit 82, etc., and determine that the driver is in the provisional anomalous state when the confirmation button 20 is not pushed for a predetermined time (t1*ref*). Similarly, the CPU may be configured to prompt the driver to push the confirmation button 20 by using the buzzer 81, the display unit 82, etc. after the provisional anomaly determination, and determine that the driver is in the final anomalous state when the confirmation button 20 is not pushed for a predetermined time (t2*ref*).

In addition, the CPU may detect the anomalous state of the driver by detecting a biological signal of the driver, the driving posture of the driver, or the operation of an anomaly determination operation switch, or by combining the detection results and the above-described "driver monitor technique"; and determine the anomalous state of the driver. For example, the CPU may determine that the driver is in the provisional anomalous state when an anomaly is continuously observed in the biological signal of the driver for the predetermined time (t1*ref*) or more, and then determine that the driver is in the final anomalous state in the case where, for the predetermined time (t2*ref*) or more, the driver continuously takes a driving posture which the driver does not take for a long period of time during driving.

In addition, in the normal-time routine shown in FIG. 3, execution of the provisional anomaly determination may be permitted when LKA is being executed, or execution of the provisional anomaly determination may be permitted when LKA and ACC are being executed. Namely, the normal-time routine may be modified as follows. A step for determining "whether or not LKA is being executed" or for determining "whether or not LKA and ACC are being executed" may be added between step 300 and step 310. When the CPU makes a "Yes" determination in the added step, the CPU proceeds to step 310. Meanwhile, when the CPU makes a "No" determination in the added step, the CPU proceeds to step 380.

Further, the magnitude of the second deceleration α2 may be equal to or less than that of the first deceleration α1. In addition, each of the first deceleration α1 and the second deceleration α2 is not necessarily required to be constant. For example, each of the first deceleration α1 and the second deceleration α2 may be set as a function.

What is claimed is:

1. A vehicle control apparatus comprising:
   vehicle speed control means for controlling vehicle speed which is speed of a vehicle;
   provisional anomaly determination means for determining, over a first time, whether or not a driver of the vehicle is in a provisional anomalous state in which the driver possibly has lost his/her ability to drive the vehicle, when the vehicle speed is equal to or higher than a first vehicle speed; and final anomaly determination means for determining, over a second time, whether or not the driver is in a final anomalous state in which the driver has lost his/her ability to drive the vehicle, when the driver has been determined to be in the provisional anomalous state, wherein the vehicle speed control means is configured:

to decelerate the vehicle at a first deceleration after a provisional anomaly determined time which is a point in time, when the driver is determined to be in the provisional anomalous state;

to maintain the vehicle speed at a second vehicle speed lower than the first vehicle speed when the vehicle speed becomes equal to or lower than the second vehicle speed before the second time elapses from the provisional anomaly determined time; and to decelerate the vehicle at a second deceleration to stop the vehicle after a final anomaly determined time which is a point in time when the driver is determined to be in the final anomalous state.

2. The vehicle control apparatus according to claim 1, wherein the second deceleration is greater in magnitude than the first deceleration.

3. The vehicle control apparatus according to claim 1, wherein the provisional anomaly determination means is configured to determine whether or not the driver is in the provisional anomalous state by determining whether or not at least one of a situation in which no steering operation is performed for the vehicle, a situation in which an accelerator operation amount of the vehicle does not change, and a situation in which a brake operation amount of the vehicle does not change continues for the first time; and the final anomaly determination means is configured to determine whether or not the driver is in the final anomalous state by determining whether or not at least one of the situation in which no steering operation is performed for the vehicle, the situation in which the accelerator operation amount of the vehicle does not change, and the situation in which the brake operation amount of the vehicle does not change continues for the second time after the driver has been determined to be in the provisional anomalous state.

4. The vehicle control apparatus according to claim 3, wherein the final anomaly determination means is configured to determine that the driver is normal and to invalidate the determination that the driver is in the provisional anomalous state when the situation in which the driver is determined to be in the provisional anomalous state ends before the second time elapses from the provisional anomaly determined time.

* * * * *